United States Patent
Chen et al.

(10) Patent No.: US 9,699,187 B2
(45) Date of Patent: Jul. 4, 2017

(54) SOCIAL NETWORKING GROUPS AS A PLATFORM FOR THIRD PARTY INTEGRATION

(71) Applicant: FACEBOOK, INC., Menlo Park, CA (US)

(72) Inventors: Sizhe Chen, San Francisco, CA (US); Kenneth Lau, Campbell, CA (US); Thomas Whitnah, Palo Alto, CA (US); Richard Armbrust, San Francisco, CA (US); Todd Jackson, San Francisco, CA (US)

(73) Assignee: FACEBOOK, INC., Menlo Park, CA (US)

( * ) Notice: Subject to any disclaimer, the term of this patent is extended or adjusted under 35 U.S.C. 154(b) by 500 days.

(21) Appl. No.: 13/843,477

(22) Filed: Mar. 15, 2013

(65) Prior Publication Data

US 2014/0280566 A1   Sep. 18, 2014

(51) Int. Cl.
*H04L 29/06*   (2006.01)
*H04L 29/08*   (2006.01)
*G06Q 10/10*   (2012.01)
*H04L 12/58*   (2006.01)

(52) U.S. Cl.
CPC .......... *H04L 63/10* (2013.01); *G06Q 10/101* (2013.01); *H04L 51/14* (2013.01); *H04L 51/32* (2013.01); *H04L 63/104* (2013.01); *H04L 67/02* (2013.01); *H04L 67/20* (2013.01); *H04L 67/306* (2013.01); *H04L 67/36* (2013.01)

(58) Field of Classification Search
CPC ..................................................... H04L 67/306
See application file for complete search history.

(56) References Cited

U.S. PATENT DOCUMENTS

| | | | |
|---|---|---|---|
| 7,917,853 B2* | 3/2011 | Trauth | G06F 3/0482 715/700 |
| 8,725,796 B2* | 5/2014 | Serena | 709/203 |
| 8,769,012 B1* | 7/2014 | Shah et al. | 709/204 |
| 8,825,658 B1* | 9/2014 | Suvar | 707/738 |
| 8,996,629 B1* | 3/2015 | Datar et al. | 709/206 |
| 9,055,050 B2* | 6/2015 | Gupta | |
| 2005/0216550 A1* | 9/2005 | Paseman | G06Q 10/00 709/202 |
| 2006/0143236 A1* | 6/2006 | Wu | G06F 17/30053 |
| 2008/0235592 A1* | 9/2008 | Trauth | G06F 3/0482 715/733 |

(Continued)

*Primary Examiner* — Jimmy H Tran
(74) *Attorney, Agent, or Firm* — Nicholson De Vos Webster & Elliott LLP

(57) ABSTRACT

Exemplary methods, apparatuses, and systems receive a request from a user to access content for a group of users of a social networking system, and send the content to the user including an interface to a third party system. The interface is to enable the user to retrieve information related to a third party service from the third party system to share with the group. The user sends the information related to the third party service to share with the group to the social networking system. The social networking system sends the shared information related to the third party service to a group member based on the group member requesting access to the content. In one embodiment, the third party service stores a file or folder on a third party server and the shared information includes a link to the shared file or folder.

20 Claims, 11 Drawing Sheets

(56) References Cited

U.S. PATENT DOCUMENTS

| | | | |
|---|---|---|---|
| 2009/0055285 A1* | 2/2009 | Law | G06Q 30/02 705/26.35 |
| 2009/0144392 A1* | 6/2009 | Wang | G06Q 10/10 709/217 |
| 2010/0037288 A1* | 2/2010 | Carraher et al. | 726/1 |
| 2011/0179176 A1* | 7/2011 | Ravichandran | G06Q 10/06 709/226 |
| 2012/0110474 A1* | 5/2012 | Chen | G06Q 10/10 715/753 |
| 2012/0197980 A1* | 8/2012 | Terleski | G06Q 50/01 709/203 |
| 2012/0210200 A1* | 8/2012 | Berger | G06F 3/04845 715/202 |
| 2013/0013667 A1* | 1/2013 | Serena | G06Q 10/10 709/203 |
| 2013/0035994 A1* | 2/2013 | Pattan | H04W 4/206 705/14.4 |
| 2013/0055089 A1* | 2/2013 | Gundotra | G06Q 10/00 715/733 |
| 2013/0160144 A1* | 6/2013 | Mok et al. | 726/29 |
| 2013/0173634 A1* | 7/2013 | Shaban Hussein | G06F 17/30165 707/748 |
| 2013/0179951 A1* | 7/2013 | Broustis et al. | 726/6 |
| 2013/0217365 A1* | 8/2013 | Ramnani | 455/414.1 |
| 2013/0282806 A1* | 10/2013 | Steinberg et al. | 709/204 |
| 2013/0346172 A1* | 12/2013 | Wu | G06Q 30/0214 705/14.16 |
| 2014/0006977 A1* | 1/2014 | Adams | H04L 51/32 715/758 |
| 2014/0081750 A1* | 3/2014 | Hosp | G06Q 30/0207 705/14.53 |
| 2014/0082744 A1* | 3/2014 | Behforooz | G06Q 50/01 726/27 |
| 2014/0108518 A1* | 4/2014 | D'Angelo | G06Q 10/10 709/203 |
| 2014/0108562 A1* | 4/2014 | Panzer | 709/206 |
| 2014/0165156 A1* | 6/2014 | Fushman et al. | 726/4 |
| 2014/0215551 A1* | 7/2014 | Allain et al. | 726/1 |
| 2014/0282100 A1* | 9/2014 | Beechuk | H04W 4/003 715/753 |

* cited by examiner

SOCIAL NETWORKING GROUPS AS A PLATFORM FOR THIRD PARTY INTEGRATION

FIELD

The various embodiments described herein relate to social networks. In particular, the embodiments relate to integration of third party services with groups of a social network.

BACKGROUND

Social networking systems have become prevalent in recent years because they provide an environment in which users can connect to and communicate with other users. Although a variety of different types of social networking systems exist, social networking systems commonly provide mechanisms allowing users to define and interact within their social networks. In this context, a user may be an individual or any other entity, such as a business or other non-person entity. A social networking system allows users to designate other users or entities as connections (or otherwise connect to, or form relationships with, other users or entities), contribute and interact with their connections, use applications, join groups, list and confirm attendance at events, invite connections, and perform other tasks that facilitate social interaction.

Groups of a social network can be formed to further facilitate communication and sharing of information amongst a group of users. However, users are generally limited to sharing information that is uploaded to and stored by the social network. For example, to share a photograph with a group, a user uploads the photograph to the social networking system.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Embodiments described herein include methods, apparatuses, and systems for implementing social networking groups as a platform. Implementing social networking groups as a platform includes enabling third party interaction with groups and/or integrating third party services into groups of the social networking system. In one embodiment, a social networking group provides a platform for users to share information related to third party services with other users in the group. For example, a user can share a file, folder, or other content stored on a third party server with members of a group. In one example where a third party folder is shared with a group, the folder and the group have a one-to-one relationship enabling collaboration amongst users on files in the shared folder. Updates to the shared content can be posted to the group (e.g., via updates pushed to the social networking system, which can then be pushed to the group).

According to one embodiment, a social networking system receives a request from a user to access content for a group of users. For example, a user can access a group webpage of the social networking system. The social networking system sends the content to the user including an interface to a third party system. The interface is to enable the user to retrieve information related to the third party service from the third party system to share with the group. For example, the user can select a file on the third party system to share with the group, and the user and/or the social networking system may receive information related to that file such as metadata and a link to the file for sharing with the group. In some embodiments, the user receives the information related to the third party service via the interface and sends the information to the social networking system. In sending the information to share to the social networking system, the user can request that the social networking system publish that information to a group webpage. After publication to the group webpage, group members that subsequently access the group webpage receive the shared information related to the third party service. Thus, social networking groups as a platform for third party integration can enable enhanced collaboration and sharing amongst users in a social network.

Figure 1:
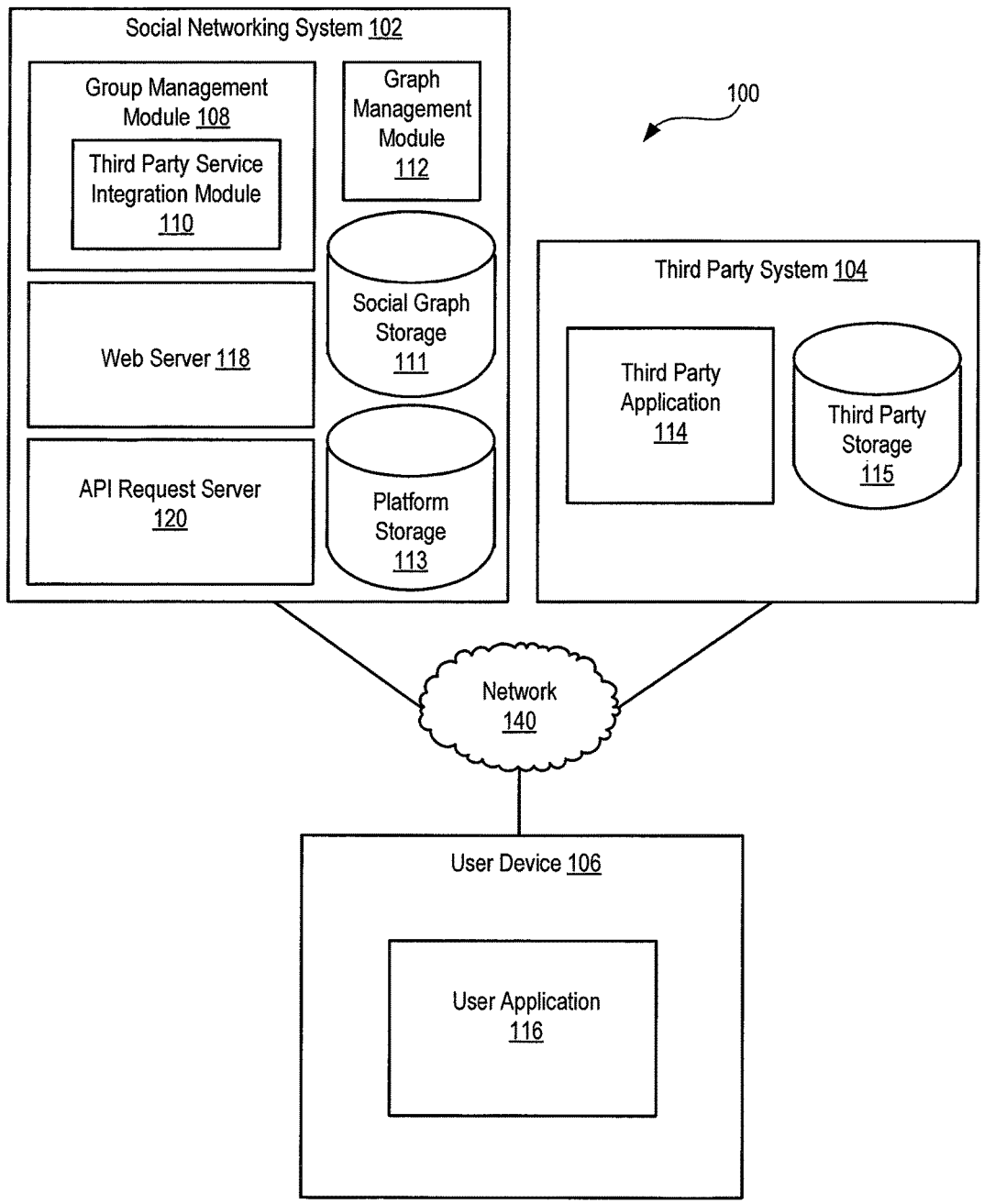
FIG. 1 illustrates a network diagram of a system for enabling third party interaction with groups on a social networking system, according to one embodiment of the invention.

FIG. 1 illustrates a network diagram of a system for enabling third party interaction with groups on a social networking system, according to one embodiment of the invention. The system 100 includes one or more user devices 106, one or more third party systems 104, the social networking system 102, and a network 140. For purposes of illustration, the embodiment of the system 100 includes a single third party system 104 and a single user device 106. However, in other embodiments, the system 100 may include more user devices 106 and/or more third party systems 104. The third party system 104 is separate from the social networking system 102. For example, the third party system 104 and the social networking system 102 may be operated by different entities. The third party system 104 can also be separate from the social networking system 102 in the sense that the third party system 104 is associated with one domain while the social networking system 102 is associated with a separate social networking domain.

A user device 106 comprises one or more computing devices that can receive input from a user and can transmit and receive data via the network 140. In one embodiment, the user device 106 is a computing system such as the exemplary system in FIG. 7. The user device 106 can be a conventional computer system executing an operating system (OS) such as a Microsoft Windows compatible OS, Apple OS X, and/or a Linux distribution. In another example, the user device 106 can be a mobile device having computer functionality, such as a personal digital assistant (PDA), mobile telephone, smart-phone, or other mobile computing device. The user device 106 is configured to communicate via the network 140. The user device 106 can execute a user application 116, for example, a browser application that allows a user of the user device 106 to interact with the social networking system 102. In another embodiment, the user device 106 interacts with the social networking system 102 through an application programming interface (API) that runs on the native operating system of the user device 106, such as iOS and ANDROID. The user device 106 is configured to communicate with the third party system 104 and the social networking system 102 via the network 140, which may comprise any combination of local area and/or wide area networks, using wired and/or wireless communication systems.

In one embodiment, the network 140 uses standard communications technologies and/or protocols. Thus, the network 140 can include links using technologies such as Ethernet, 802.11, worldwide interoperability for microwave access (WiMAX), 3G, 4G, CDMA, digital subscriber line (DSL), etc. Similarly, the networking protocols used on the network 140 can include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP). The data exchanged over the network 140 can be represented using technologies and/or formats including the hypertext markup language (HTML) and the extensible markup language (XML). In addition, all or some links can be encrypted using conventional encryption technologies such as secure sockets layer (SSL), transport layer security (TLS), and Internet Protocol security (IPsec).

The user device 106 includes the user application 116 for displaying content from the third party system 104 and/or from the social networking system 102. For example, in one embodiment, the user device 106 displays content from the third party system 104 and/or from the social networking system 102 by processing a markup language document using a browser application. A markup language document can identify content and one or more instructions describing formatting or presentation of the content. By executing the instructions included in a markup language document, the user application 116 displays the identified content using the format or presentation described by the markup language document. In one such example, the markup language document includes instructions for generating and displaying a web page having multiple frames that include text and/or image data retrieved from the third party system 104 and/or from the social networking system 102. A markup language document may include a data file including extensible markup language (XML) data, extensible hypertext markup language (XHTML) data, or other markup language data. Additionally, a markup language document may include JavaScript Object Notation (JSON) data, JSON with padding (JSONP), and JavaScript data to facilitate lightweight data interchange between the user device 106 and the third party system 104 and/or the social networking system 102. In one such example, the user application 116 includes a JavaScript compiler to decode such a markup language document.

The third party system 104 includes one or more third party applications 114 and third party storage 115. The third party system 104 provides service(s) via the one or more third party applications 114 over the network 140 such as: file storage and sharing, photo sharing, photo editing, task list management and sharing, calendar management and sharing, internet and/or personalized radio, invitation services, fantasy sport services (e.g., fantasy football), video sharing, video editing, internet and/or personalized television, other social networking services separate from the social networking system, movie rental services, movie review services, movie ticket reservation and/or purchase services, book and or/e-book loan or rental services, shopping services, gift registry services, shopping wish list services, restaurant related services (e.g., restaurant review services, restaurant reservation services, restaurant menu services, and other restaurant related services), polling services, blogging services, food-related services (e.g., recipe reviews, virtual recipe box sharing, menu generation services, grocery list generation services, nutrition content related services, and other food-related services), sports-related services (e.g., sharing training routes or statistics, and other sports-related services), forum services, business-related services (e.g., databases, payroll, and other business-related services), and/or any other internet services or applications. The third party system 104 can include web page content, which the user device 106 accesses via the network 140 with the user application 116.

The social networking system 102 includes a web server 118, an application programming interface (API) request server 120, platform storage 113, and social graph storage 111. Platform storage 113 stores user preferences/settings, profile data, and other information for operation of the social networking system. The social networking system 102 includes platform applications. Examples of platform applications include applications for social interactions (e.g., publishing posts, pictures, etc.) as well as social games, messaging services, and any other application that uses the social platform provided by the social networking system 102. The web server 118 links the social networking system 102 to the user device 106 and/or one or the third party system 104 via the network 140. The web server 118 serves web pages, as well as other web-related content, such as Java, Flash, XML, and so forth. The web server 118 may include a mail server or other messaging functionality for receiving and routing messages between the social networking system 102 and the user device 106. The messages can be instant messages, queued messages (e.g., email), text and SMS messages, or any other suitable messaging format.

The Application Programming Interface (API) request server 120 allows one or more third party systems 104 and user devices 106 to access information from the social networking system 102 by calling one or more APIs. The API request server 120 may also allow the third party system 104 to send information to the social networking website by calling APIs. The third party system 104, in one embodiment, sends an API request to the social networking system 102 via the network 140 and the API request server 120 receives the API request. The API request server 120 processes the request by calling an API associated with the API request to generate an appropriate response, which the API request server 120 communicates to the third party system 104 via the network 140. In one embodiment, the user device 106 communicates with the social networking system 102 via APIs in the same manner as the third party system 104.

According to one embodiment, the social networking system 102 includes graph management module 112 to manage a social graph. Managing a social graph can include functions such as: creating and maintaining graph nodes and edges, defining possible graph node and edge types, facilitating third party interaction with the social graph, and/or other functions with respect to the social graph. Examples of facilitating third party interactions with the social graph can include enabling third party defined graph node or edge types, adding, removing, or modifying social graph nodes and/or edges, and/or other third party interaction facilitation.

Users join the social networking system 102 and then can add connections to a number of other users of the social networking system 102 to whom they desire to be connected. As used herein, the term "friend" refers to any other user of the social networking system 102 to whom a user has formed a connection, association, or relationship via the social networking system 102. Connections may be added explicitly by a user or may be automatically created by the social networking system 102 (e.g., based on common characteristics of the users). For example, a first user specifically selects a particular other user to be a friend. Connections between users of the social networking system 102 are usually bilateral, or "mutual," but connections may also be unilateral, or "one-way." For example, if Bob and Joe are both users of the social networking system 102 and connected to each other, Bob and Joe are each other's connections. If, on the other hand, Bob wishes to connect to Joe to view data communicated to the social networking system by Joe but Joe does not wish to form a mutual connection, a unilateral connection may be established. The connection between users may be a direct connection; however, some embodiments of a social networking system allow the connection to be indirect via one or more levels of connections or degrees or separation.

In addition to establishing and maintaining connections between users, the social networking system 102 provides users with the ability to interact with other items that are capable of being represented in the social networking system 102. For example, users can interact with groups of the social networking system. A group management module 108 of the social networking system 102 manages group formation and maintenance. Groups generally include two or more users of the social network. Users in a group may be referred to as members. The group management module 108 can define and manage group properties such as privacy settings which control user access to the group (e.g., who can see the group, who can see membership of the group, and who can see information shared with or posted to the group). For example, a group can be open such that anyone can see the group, its members, and/or information shared with the group, closed such that anyone can see the group, but only members can see information shared with the group, secret such that only members can see the group and information shared with the group, or any other privacy setting.

Groups can enable a user to share information with a subset of users of the social network, for example, friends, family, teammates, classmates, coworkers, users sharing common interests, or any other subset of users of the social network. In one embodiment, a third party service integration module 110 enables users to share information related to third party services with a group of the social networking system. Sharing information related to third-party services can include adding, uploading, sending, or "posting" to the social networking system 102. For example, a user communicates posts to the social networking system 102 from the user device 106. Posts may include data such as status updates or other textual data, location information, photos, videos, links, music or other similar data and/or media.

Integrating third party services with a group of the social networking system can include, for example: providing a link to the third party service and/or content stored on the third party system 104, providing updates related to the third party service, and providing mechanisms for limiting access to the third-party service or information related to the third party service based on membership in a group. For example, a user can request to share a file stored on the third party system 104 with a group of the social networking system. When a member of the group accesses content for the group (e.g., by visiting a group webpage), the member can access information related to the file. For example, a group webpage can include a Uniform Resource Locator (URL) to the file, metadata related to the file (e.g., a file name, file size, file type, file creation date, file modification date, file access date, file permissions, file revision history, and/or other metadata related to the file), a message related to the file (e.g., a status update of the file, a message that a group member associated with the file, and/or other messages). If the file (or other content or service) is stored on the third party system 104, the information shared with the group may include, for example, a logo from the third party system, a thumbnail of a shared photo, a clip of a video or audio file, a photo from a photo album, and/or some other representation of the shared file or service.

In one embodiment, as users of the social networking system 102 share information related to third party services stored on the third party system 104 with a group, information related to the third party service may be stored by the social networking system 102. The social networking system 102 can store information related to third-party services in a social graph with graph management module 112. The graph management module 112 is capable of linking a variety of entities in a social graph. The social graph comprises a plurality of nodes interconnected by a plurality of edges. Each node in the social graph may represent an entity that can act on another node and/or that can be acted on by another node. The social graph may include various types of nodes. Examples of types of nodes include users, non-person entities, content items, webpages, groups, events, messages, third-party services or content, concepts, and any other things that can be represented by an object in the social networking system 102. An edge between two nodes in the social graph represents a particular kind of connection between the two nodes, which may result from an action that was performed by one of the nodes on the other node. As various nodes interact with each other, the social networking system 102 modifies edges connecting the various nodes to reflect the interactions.

Figure 2:
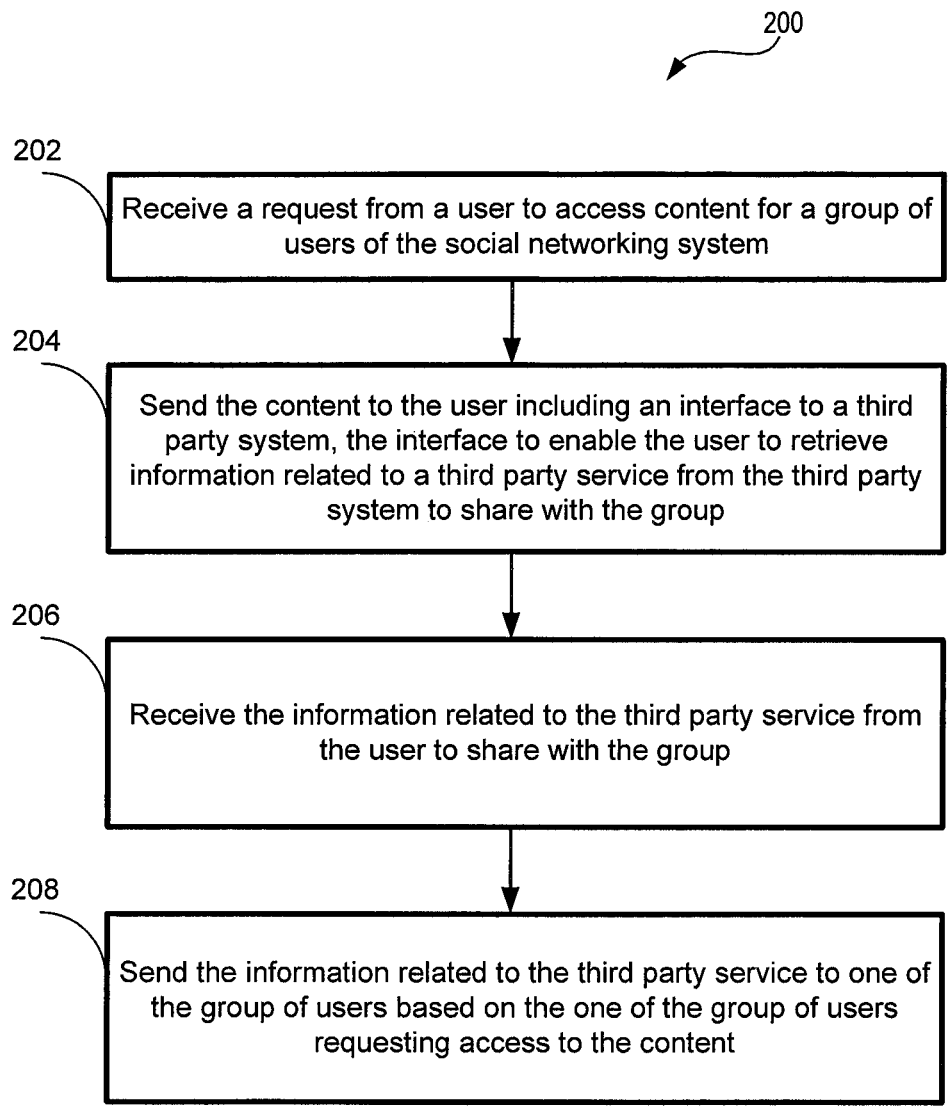
FIG. 2 illustrates a flow diagram for a method enabling third party interaction with groups, according to one embodiment of the invention.

FIG. 2 illustrates a flow diagram for a method of third party interaction with groups, according to one embodiment of the invention. Third party interaction with groups can include enabling a user to share information related to third party services. For example, a user can share a file or folder stored by a third party system with a group of the social networking system. The method 200 is executed by one or more processing devices (e.g., the computing system 700 of FIG. 7). For the ease of explanation, the method 200 will be primarily described from the "vantage point" of the social networking system 102 of FIG. 1.

Figure 6A:
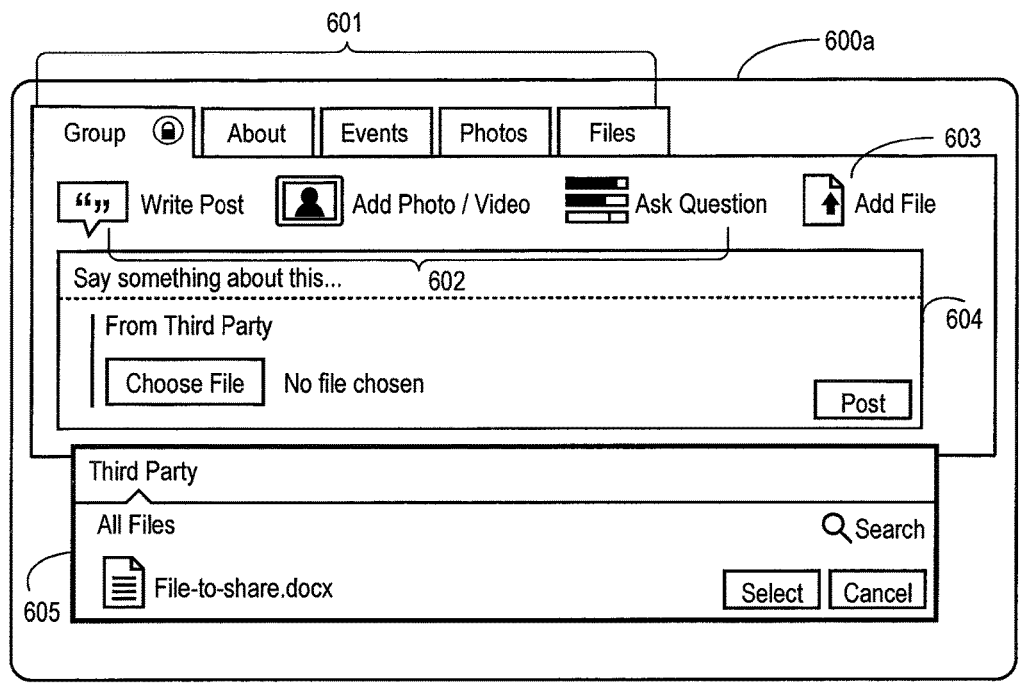
FIGS. 6a-6c illustrate exemplary GUI windows displaying group content, including an interface for enabling third party interaction, according to embodiments of the invention.

At block 202, a social networking system receives a request from a user to access content for a group of users of the social networking system. The requested content can be, for example, a webpage or other presentation of information related to the group. At block 204, the social networking system sends the content to the user in the form of a webpage, including an interface to a third party system. For example, the interface can provide access to the third party system 104 of FIG. 1. The interface is to enable the user to retrieve information related to a third party service from the third party system to share with the group. In one embodiment, the interface includes an inline frame (iframe) targeting a URL of the third party system. In other words, the third party system has provided content to the social networking system for it to provide to the user. FIG. 6a and the corresponding description provide an example of an inline frame. In some embodiments, the user provides permission to allow the third party system to have access to his/her group, his/her email address, and his/her friends' groups.

At block 206, the social networking system receives the information related to the third party service from the user to share with the group. The third party service could include, for example, storing user content on a third party server. Other examples of third party services are described above with respect to FIG. 1. In one embodiment where the third party service includes storing user content, the information related to the service includes a link (e.g., a URL) to access the user content stored on the third party server. This URL can be a public URL or a private URL (e.g., a URL that relies on group inclusion verification and/or the group's classification). The information related to the service could also include, for example, metadata related to the third party service and/or user comments.

At block 208, the social networking system sends the information related to the third party service to one of the group of users based on the one of the group of users requesting access to the content. In one embodiment, sending the information related to the service comprises sending content for rendering a message (e.g., story) describing an interaction of the user with the third party service. For example, the information could be contained in a message posted to a webpage for the group. Messages could include descriptions such as: "user has shared a file with the group." Other examples of messages are described with reference to FIGS. 4a and 4b, which depict interactions between the social networking system and third party systems.

In one embodiment, the social networking system sends notice to the third party system that the information related to the third party service is shared with the group. By notifying the third party system that the information is shared, the third party system can send updates regarding the shared information. For example, if a user shares a file that is stored by the third party system with the group, the third party system could push updates related to the shared file to the social networking system. In one embodiment, the third party system sends updates without being polled by the social networking system (e.g., periodically, or upon modification to the file, and/or upon detection of another event). In one embodiment, the social networking system can request updates (e.g., periodically, and/or upon detection of an event such as a group member accessing the file). Updates related to the shared file could include, for example, updates about modifications to the file such as who edited the file and when it was edited. When the social networking system receives an update related to a third party service from the third party system, the social networking system can pass that update on to members of the group (e.g., push notifications to the group). For example, the social networking system can send updated information related to the third party service to one of the group of users based on receiving the update and based on the one of the group of users requesting access to the content.

In one embodiment, the third party service includes storing not just a file, but a set of files or a folder on a third party server. In one such embodiment, the social networking system receives updates from the third party system when a file in the folder is added, updated, or deleted. The social networking system can then send updated information related to the folder to one of the group of users based on receiving the updates and based on that user requesting access to the content.

According to one embodiment, the social networking system and/or the third party can control permissions to a third party service (or related information) based on group membership. For example, the third party can determine whether a user is a group member prior to permitting access to a stored file. Such access control based on membership can restrict non-group members from viewing or otherwise accessing a shared file or other service or content, or can be dependent upon the type of access (e.g., non-group members can view a shared file, but not edit, delete, or add a file).

In one embodiment where a user shares a folder with a group, the folder and the group have a one-to-one correspondence such that every member of the group is a collaborator for the shared folder. In one such embodiment, a user that later joins the group of the social networking system automatically becomes a collaborator in the folder stored by the third party system. Automatically becoming a collaborator in the folder may entail going through a permissions flow or other sign-in flow to officially allow access to the shared folder. Once a group member gains access to the shared folder, the social networking system can push a notification to the group about the member gaining access. Similarly, if a user leaves a group, the user can automatically lose access to the shared folder. Automatically removing a user from accessing a folder can entail, for example, the social networking system sending notification to the third party system upon the user exiting the group. According to one embodiment, when a group of the social networking system is initially created, a corresponding folder is created by the third party system.

In one embodiment, the social networking system grants permission to a third party system to manage membership in the social networking group. The third party system can determine which users can join the group by sending membership criteria and/or other information to the social networking system. For example, a third party system can provide email addresses or other user identifying information to the social networking system. In another example, the third party system can indicate criteria stored by the social networking system such as membership in another group (e.g., alumni from a particular school, or other group memberships) user profile information (e.g., geographic location, interest in a genre of music, and/or other profile information), or any other information about users stored by the social networking system. Upon receiving notification from the third party system to grant membership in a group to a user, the social networking system can add the user to the group (e.g., automatically add the user to the group or send an invitation to the user to join the group).

In one embodiment where a third party system uses group membership (e.g., for determining permission to access a file or service on a third party server), the social networking system sends notifications to the third party system when a change in group membership occurs. The third party system can then poll the social networking system to determine group membership based on receiving the notification. Thus, the third party system can rely on having current group membership information without polling the social networking system each time it needs to use the group membership information.

Figure 3A:
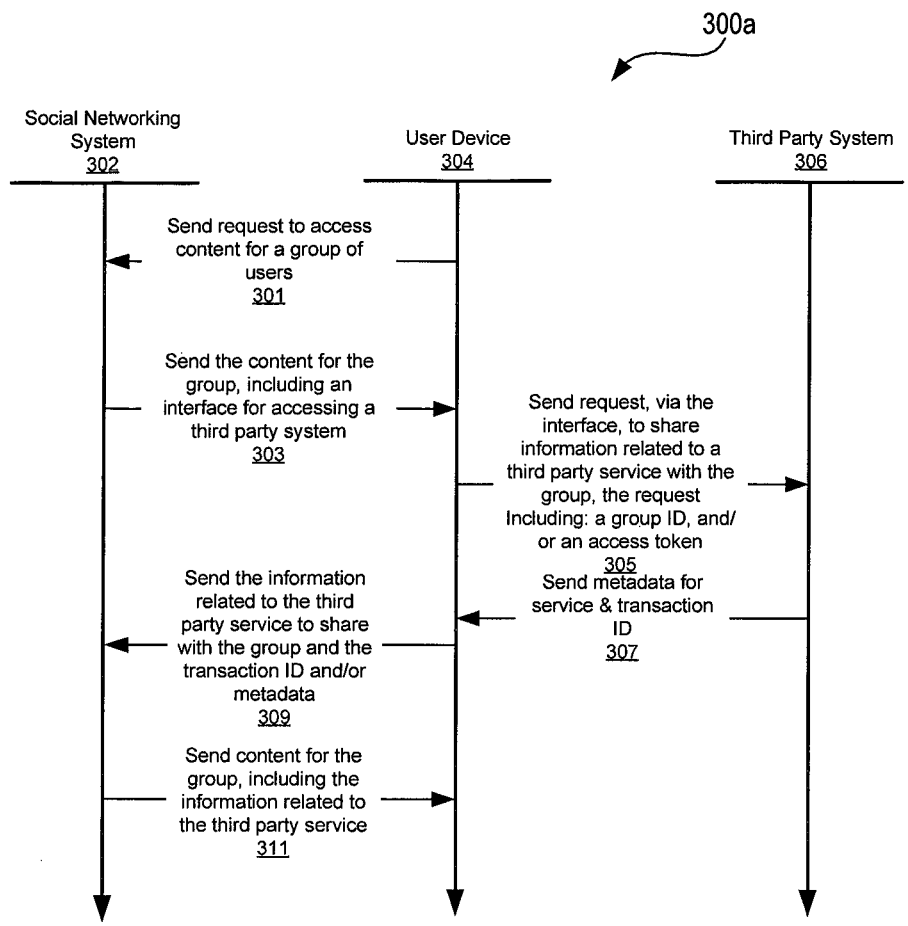
FIG. 3a illustrates an exchange amongst a social networking system, a user device, and a third party system enabling third party interaction with groups, according to one embodiment of the invention.

FIG. 3a illustrates an exchange amongst a social networking system, a user device, and a third party system enabling third party interaction with groups, according to one embodiment of the invention. The exchange 300a provides one exemplary embodiment of the method described with reference to FIG. 2. The exchange 300a can enable third party interaction with groups by, for example, enabling a user to share information related to third party services.

The exchange 300a begins with the user device 304 sending a request 301 to the social networking system to access content for a group of users of the social networking system 302. For example, the user device accesses a webpage of the group. In response, the social networking system 302 sends the requested content 303 for the group, including an interface to access a third party system. In one embodiment, the social networking system 302 sends HTML content for rendering by a browser application on the user device 304, the HTML content including an iframe which targets the third party system 306. The user device 304 sends a request 305 to the third party system 306 via the interface, the request including a group ID identifying the group of the social networking system. The request can include an access token which includes permission information, such as information indicating that a user has granted permission for the third party system to interact with the social networking system on its behalf. The request can also include information that identifies a service or file of the third party system 306. In response, the third party system 306 sends a transaction ID and/or metadata 307 related to the service to the user device 304. The transaction ID can be a unique ID used by the social networking system 302 and the third party system 306 to identify and communicate which service and/or file is being shared with a particular group.

The user device 304 sends the information 309 related to the third party service to share with the group and the transaction ID and/or metadata that it received from the third party system. For example, the user device 304 can send the information related to the third party service for publishing on a group page. The social networking system 302 can store some or all of the received information related to the third party service for inclusion on a group webpage. The social networking system 302 then sends the content 311 for the group, including the information related to the service, to the user device 304.

Figure 3B:
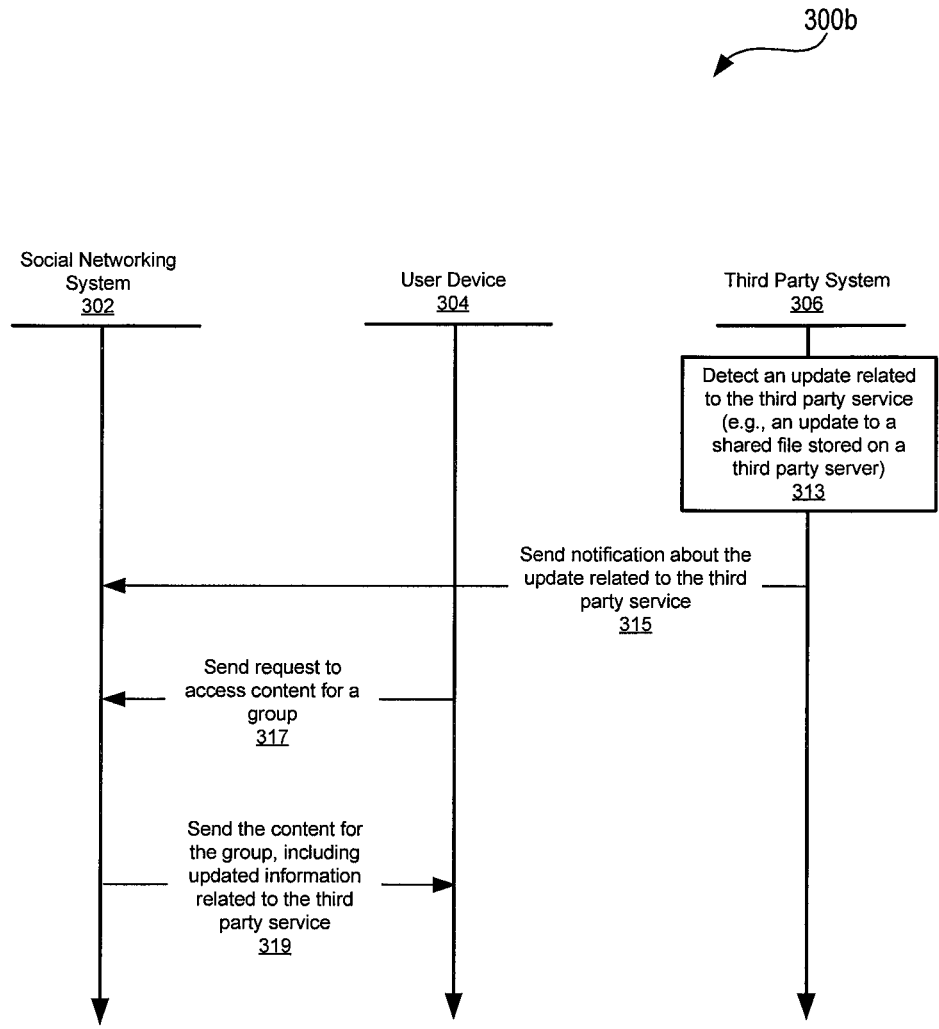
FIG. 3b illustrates an exchange amongst a social networking system, a user device, and a third party system enabling third party interaction with groups, including posting updates to the group, according to one embodiment of the invention.

FIG. 3b illustrates another exchange amongst a social networking system, a user device, and a third party system, the exchange including posting updates to the group, according to one embodiment of the invention. After a user has shared information related to a third party service with a group, the user may wish for the group to stay apprised of updates related to that third party service. For example, if the user shares a file stored on a third party server with the group, the social networking system can publish updates about that file (e.g., publish a message about the file being updated). In one embodiment, the exchange 300b begins with the third party system 306 detecting an update 313 related to the third party service. For example, the third party system 306 can detect when a shared file is updated. This update does not need to originate in the social networking service, but can be an action first performed on the third party system. In response, the third party system 306 sends notification 315 to the social networking system 302 about the detected update. Then, when the user device 304 requests 317 to access content for the group, the social networking system responds by sending the content 319, including the updated information received from the third party system 306.

Figure 3C:
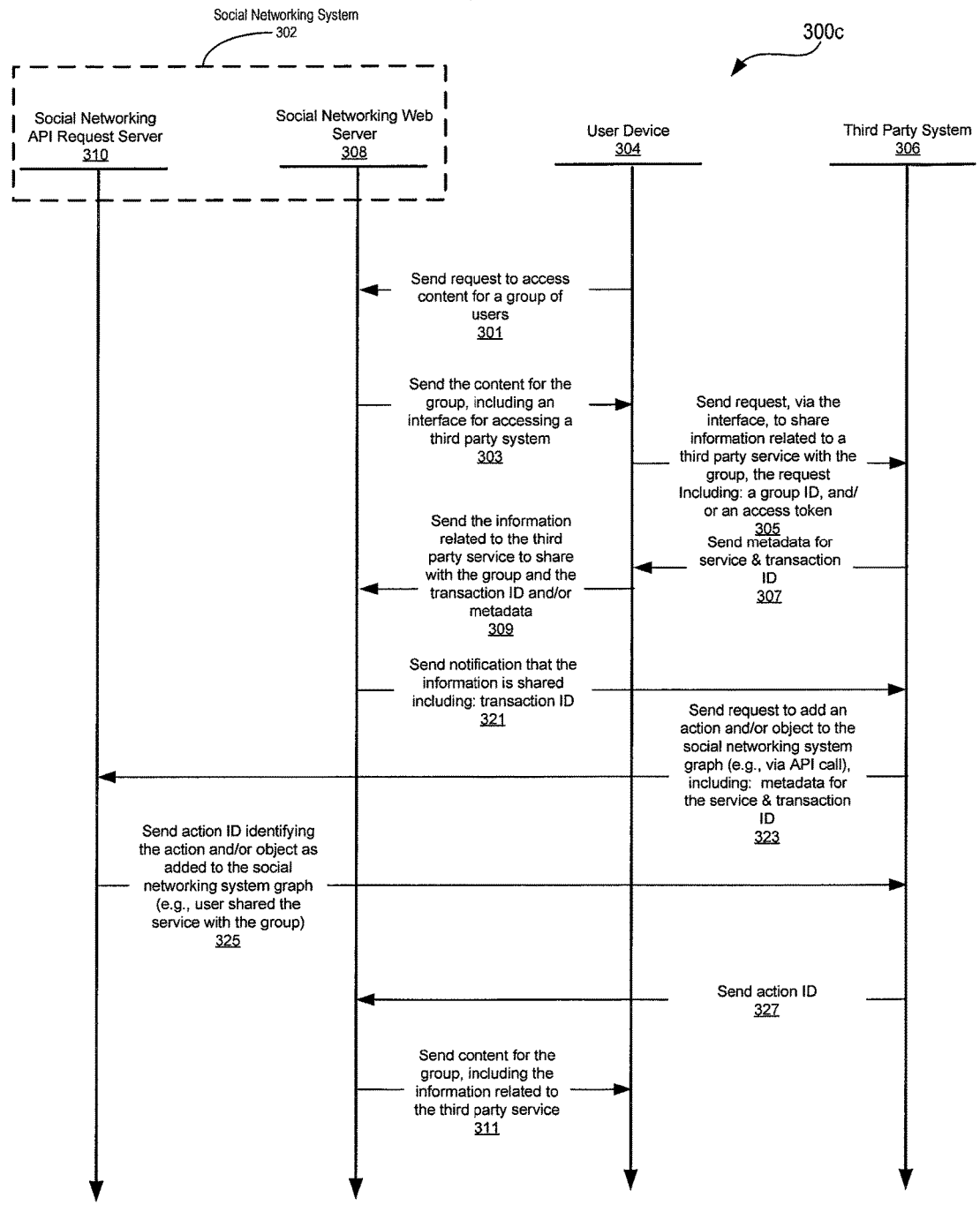
FIG. 3c illustrates an exchange amongst a social networking API request server, a social networking web server, a user device, and a third party system enabling third party interaction with groups, according to one embodiment of the invention.

FIG. 3c illustrates an exchange amongst a social networking API request server, a social networking web server, a user device, and a third party system enabling third party interaction with groups. The exchange diagram 300c is similar to the diagram 300a in that it can enable a user to share information related to a third party service with a group. Exchange diagram 300c also includes exemplary exchanges for adding objects and/or actions to a graph of the social networking system, according to one embodiment of the invention.

The exchange diagram 300c illustrates the social networking system 302 as including a social networking API request server 310 and a social networking web server 308. In the illustrated embodiment, the user device 304 is interacting with the social networking web server 308 in exchanges 301, 303, and 309. The exchange diagram 300c begins as the diagram 300a of FIG. 3a, with exchanges 301, 303, 305, 307 and 309.

After the user device 304 sends the information 309 related to the third party service to share with the group, the social networking web server 308 sends notification 321 that the information is shared, including the transaction ID. The third party system 306 then sends a request 323 to the social networking API request server 310 to add an action and/or object to a social graph. The request includes the transaction ID and/or metadata for the service.

The social networking system can store the information related to the third party service in a graph, the graph including a plurality of nodes and a plurality of edges representing relationships between two nodes. The plurality of nodes can include a node for the group and a node associated with the third party service. In one such embodiment, the plurality of edges includes an edge between the node for the group and the node associated with the third party service which indicates that the information related to the service is shared with the group. In one embodiment, the plurality of nodes further includes a node for the user and the plurality of edges further includes an edge between the node for the group and the node for the user indicating that the user shared the information related to the third party service with the group. An example of objects and/or actions in a social graph is further described with reference to FIG. 5.

In response to receiving the request to add an action and/or object, the social networking system 302 adds the object and/or action to the social graph, and sends 325 an action ID identifying the added object and/or action. The third party system 306 sends the action ID 327 received from the social networking API request server 310 to the social networking web server 308. The social networking web server 308 then sends the content 311 for the group to the user device 304, including the information related to the third party service.

Figure 3D:
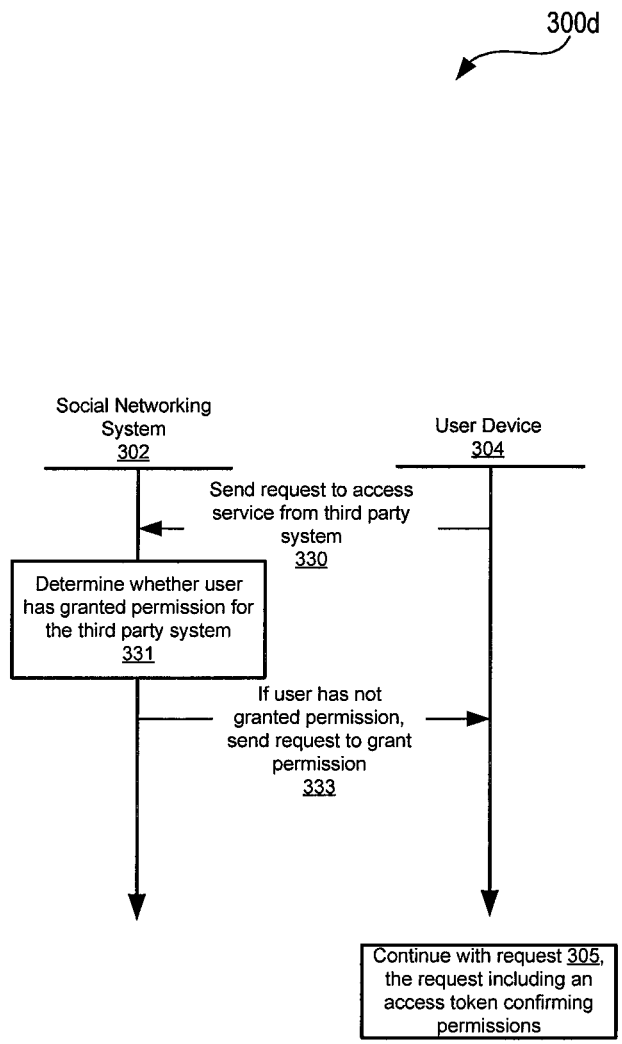
FIG. 3d illustrates an exchange amongst a social networking system and a user device for enabling third party interaction with groups, including confirming permissions for the third party interaction, according to one embodiment of the invention.

FIG. 3d illustrates another exchange amongst a social networking system and a user device, including granting permissions for third party interaction, according to one embodiment of the invention. The exchange diagram 300d can supplement the exchange diagrams 300a-c, where a user device 304 interacts with the social networking system 302 and a third party system 306 to share information related to a third party service with a group. According to the illustrated exchange 300d, the user device 304 sends a request 330 to the social networking system 302 to access a service from the third party system. For example, a user could indicate to the social networking system 302 the desire to share information related to a third party service with the group. In one such example, the user could click a button or link on a group webpage indicating the user wants to add a file stored on a third party server with the group, or to share other content or information related to third party services.

In response to receiving the request to access the third party service, the social networking system 302 determines 331 whether the user has granted permission for the third party system. Granting permissions can include, for example, granting permission for the third party system to send and/or publish the information related to the service to the social networking system on behalf of the user, granting permission to access groups of the user, granting permission to access friends of the user, and/or granting other permissions related to sharing with a group. If the user has not granted permission, the social networking system 302 sends a request 333 to the user device 304 to grant the permission. If the user confirms permissions, the exchange can continue with request 305 of FIG. 3a, the request including an access token confirming the permissions.

Figure 4A:
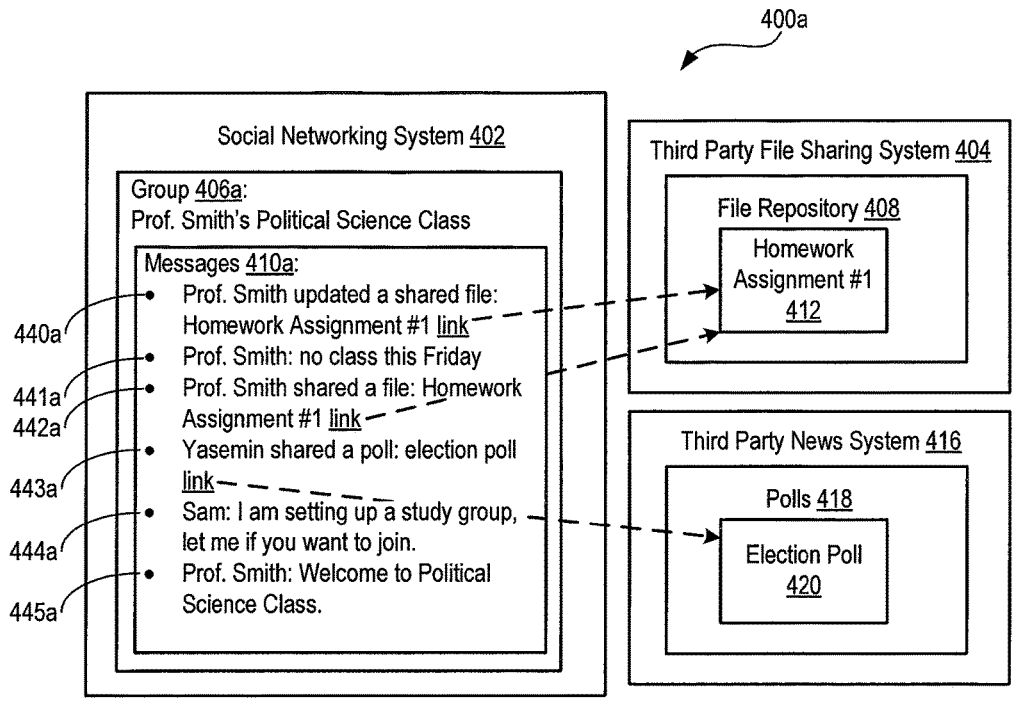
FIGS. 4a and 4b illustrate block diagrams of third party interactions with groups of a social networking system, according to embodiments of the invention.
Figure 4B:
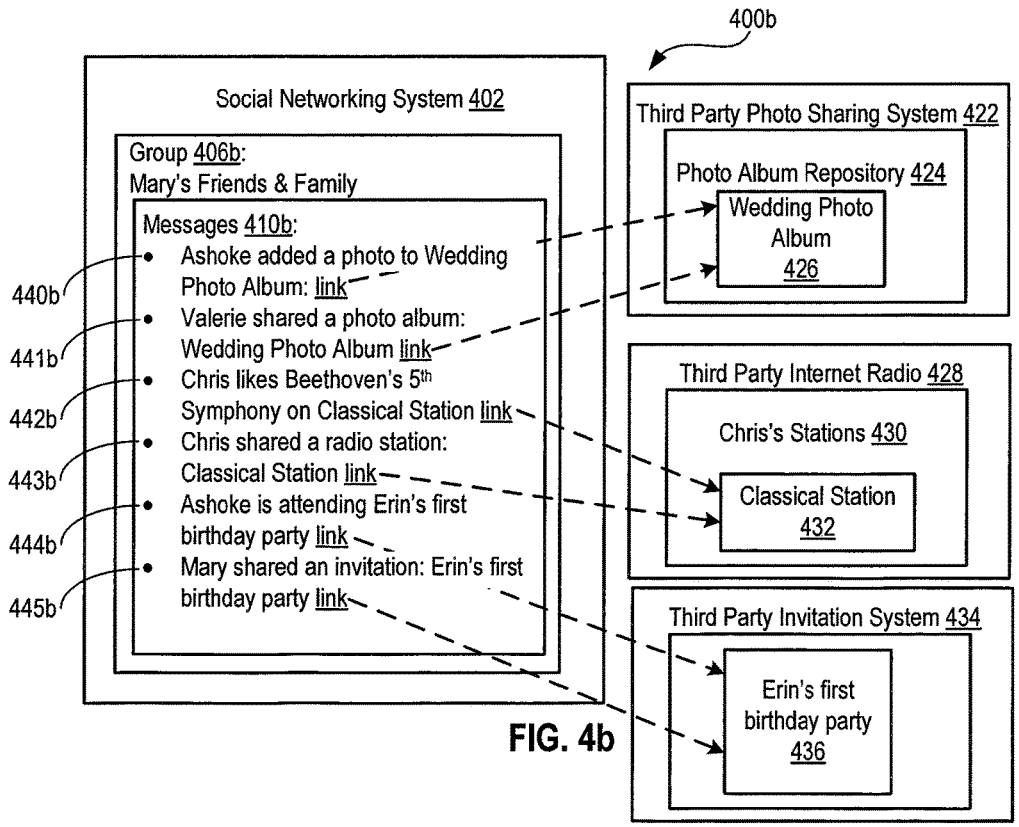

FIGS. 4a and 4b illustrate block diagrams of third party interactions with groups, according to embodiments of the invention. Block diagrams 400a and 400b illustrate a social networking system 402 (e.g., the social networking system 102 of FIG. 1) and third party systems 404, 416, 422, 428, and 434 (e.g., the third party system 104 of FIG. 1). The social networking system 402 includes groups of users, such as the group 406a, "Prof. Smith's Political Science Class," and the group 406b, "Mary's Friends & Family." The social networking system 402 can store information associated with the groups 406a and 406b, such as group membership, messages posted by group members, and other information associated with groups. For example, group 406a is associated with messages 410a, and group 406b is associated with messages 410b. Messages 410a and 410b could be sent to a user requesting access to group content. For example, the social networking system 402 can send HTML content including the messages 410a and 410b for rendering by a user application.

Messages posted by group members could include, for example, messages 445a, 444a, and 441a of FIG. 4a, which indicate a group member and a statement shared by that group member. For example, messages 410a include a message posted by a user named "Prof. Smith" which states "Welcome to Political Science Class."

The messages 410a and 410b can also include information related to a third party service shared by a group member. For example, messages 444a, 443a, 442a, and 440a of FIG. 4a, and messages 440b-445b of FIG. 4b indicate that a group member shared information related to a third party service. For example, message 442a indicates that "Prof. Smith shared a file: Homework Assignment #1." In another example, the message 443a indicates that "Yasemin shared a poll." In one embodiment, the shared information related to the third party service includes a link to a third party system. For example, a third party file sharing system 404 includes a file repository 408 for storing user files, including the shared "Homework Assignment #1" 412. The message 442a includes a link to the shared file "Homework Assignment #1" 412 stored by the third party file sharing system 404. As illustrated in this embodiment, the social networking system 402 does not need to store the shared file, but instead stores information sufficient to connect group members to the shared file. Similarly, the third party news system 416 includes polls 418, which includes the shared election poll 420. The message 443a includes a link to the shared election poll 420.

As described above with reference to FIG. 2 and FIG. 3b, updates related to a third party service can result in messages posted to a group. For example, if Prof. Smith updates "Homework Assignment #1" 412 stored by the third party file sharing system 404, the messages 410a can include message 440a which indicates "Prof. Smith updated a shared file." In one embodiment, enabling updates regarding shared third party services enables a user to share an updated file with a group of the social networking system without interacting with the social networking system. In embodiments of the invention, updates can be published to a group in addition to originally posted messages (e.g., the first message indicating a file is shared with the group), updates can replace originally posted messages, or updates can be published as comments on the originally posted messages. In one embodiment, an originally posted message about shared third party information is "replaced" in the sense that it is modified to describe the update and/or re-published with an updated timestamp. For example, if Prof. Smith updates the file "Homework Assignment #1" 412, instead of messages 410a including two messages about the file (e.g., the originally posted message 442a and an update message 440a), the social networking system 402 modifies the originally posted message 442a to indicate that "Prof. Smith updated a shared file," and the social networking system modifies the message's timestamp to reflect the update. In one such embodiment, the social networking system provides a link in the modified message to access revision history associated with the message.

In the illustrated embodiment, the social networking system 402 publishes a new message for each update. For example, when Prof. Smith updates the file "Homework Assignment #1" 412, a new update message 440a is published to the group. In one such embodiment, the social networking system can provide a group object (e.g., content viewable as a group webpage) that includes all published messages and/or comments associated with the shared information related to the third party service. For example, the social networking system 402 can provide a group webpage for a shared file or folder that includes information related to that shared file or folder such as revision history and messages associated with the file or folder.

The messages 410b of FIG. 4b illustrate additional examples of shared information related to third party services. Message 445b indicates that a user named Mary shared an invitation to "Erin's first birthday party," and includes a link to a third party invitation system 434 which includes the actual invitation 436. Message 443b indicates that a user named Chris shared a radio station "Classical Station," and includes a link to one of Chris's stations 430 called "Classical Station" 432 provided by a third party internet radio system 428. Message 441b indicates that a user named Valerie shared a photo album called "Wedding Photo Album," and includes a link to the "Wedding Photo album" 426 stored in a photo album repository 424 by a third party photo sharing system 422.

The messages 410b also include examples of updated information related to third party services. For example, message 444b indicates that a user named Ashoke is attending "Erin's first birthday party." Message 442b indicates that Chris likes the song "Beethoven's 5th Symphony" on "Classical Station." Message 440b indicates that Ashoke added a photo to "Wedding Photo Album." The examples illustrated in the messages 410a and 410b all include links to files, services, or other content stored or provided by third party systems, but other embodiments may not include links. For example, the message 444b indicating Ashoke's attendance to a party may not include a link. Similarly, the message 445b indicating that Mary shared an invitation may not include a link. Messages without links may include only explanatory information related to the third party service (e.g., "Mary shared an invitation"), or such messages may include other information to enable group members to access a third party service, file, or other content (e.g., an access code).

The groups 406a and 406b are illustrated as containing messages 410a and 410b for illustration purposes only, and do not limit the form or manner in which the social networking system 402 associates groups and the information in the messages. For example, the information contained in a message can be stored as a combination of objects and actions in a social graph. An example of how the social networking system 402 could store such information in a social graph is described with reference to FIG. 5.

Figure 5:
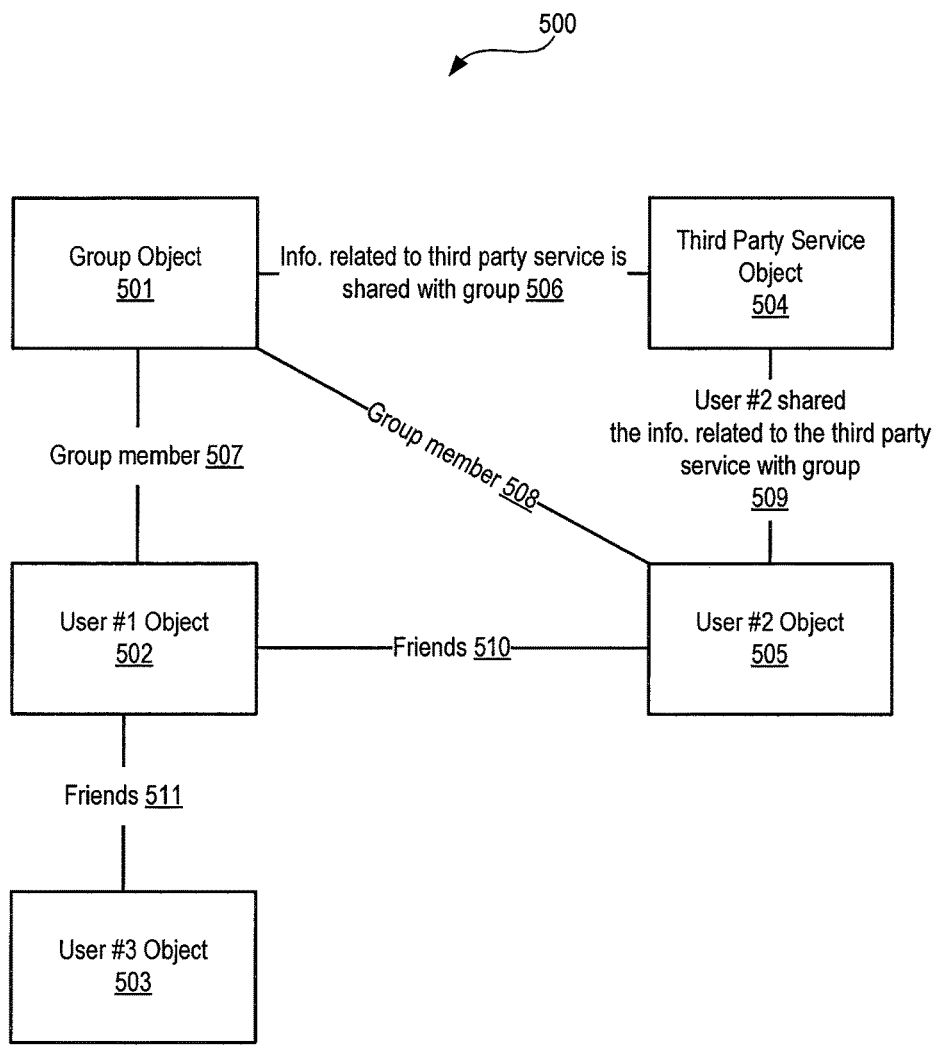
FIG. 5 illustrates a block diagram of a graph for representing third party interactions with groups, according to one embodiment of the invention.

FIG. 5 illustrates a block diagram of a graph for representing third party interactions with groups, according to one embodiment of the invention.

The graph 500 includes objects represented as nodes 501-505 and edges 506-511 interconnecting the nodes 501-505. The graph 500 includes a group object node 501 representing a group of users of a social networking system (e.g., the group 406a of FIG. 4a). The graph 500 also includes user object nodes 502, 503, and 505, and a third party service object node 504. The user object nodes 502, 503, and 505 represent users of the social networking system (e.g., the user Prof. Smith in FIG. 4a). The third party service object node 504 is associated with a third party service. For example, the third party service object node 504 can represent the "Homework Assignment #1" 412 of FIG. 4a, or the "Classical Station" 432 of FIG. 4b.

The graph 500 also includes edges 506-511 which interconnect the nodes 501-505 and represent relationships and/or actions between interconnected nodes. For example, the edge 507 connects the group object node 501 and the user #1 object node 502, and indicates that user #1 is a member of the group. Similarly, the edge 508 connects the group object node 501 and the user #2 object node 505, and indicates that user #2 is a member of the group. However, the user #3 object node 503 is not connected to the group object node 501 via an edge, which indicates that user #3 is not a member of the group. The edge 510 connects the user #1 object node 502 and the user #2 object node 505, and indicates that user #1 and user #2 are friends in the social network. Similarly, the edge 511 connects the user #1 object node 502 and the user #3 object node 503, and indicates that user #1 and user #3 are friends.

The third party service object node 504 is connected to both the group object node 501 and the user #2 object node 505 via edges 506 and 509 respectively. The edge 506 between the group object node 501 and the third party service object node 504 indicates that information related to the third party service is shared with the group. For example, if Prof. Smith shares the file "Homework Assignment #1" 412 with the group 406a, the social networking system creates the edge 506 between the group object node 501 and the third party service object node 504. If Prof. Smith is represented by the user #2 object node 505, the social networking system can also create the edge 509 between the third party service object 504, and the user #2 object node 505 indicating that Prof. Smith shared a link to the file "Homework Assignment #1" 412 with the group.

Nodes and/or edges of the graph 500 can be added, removed, or modified by the social networking system. The social networking system can modify the graph 500 based on requests or other input from a third party system. An example of such a method is described with respect to FIG. 3c.

Figure 6B:
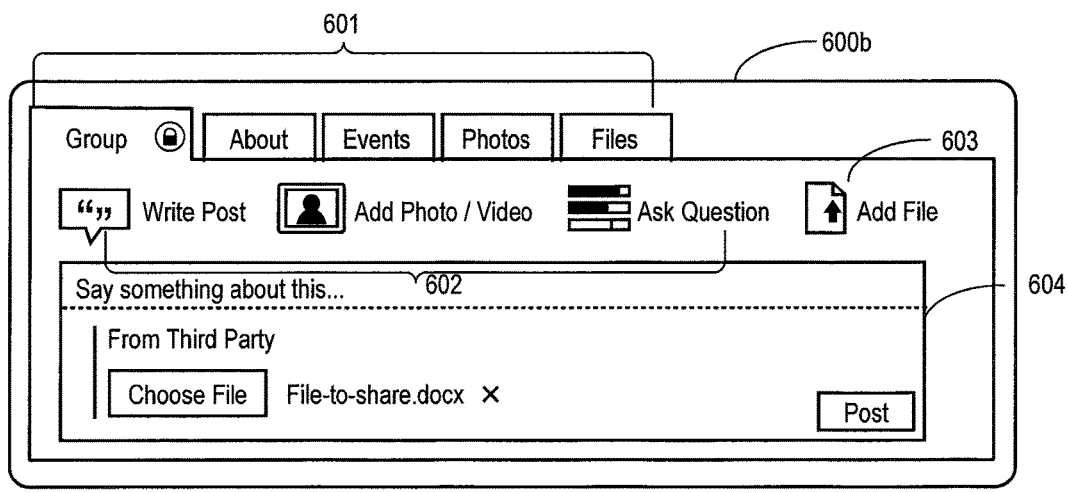
Figure 6C:
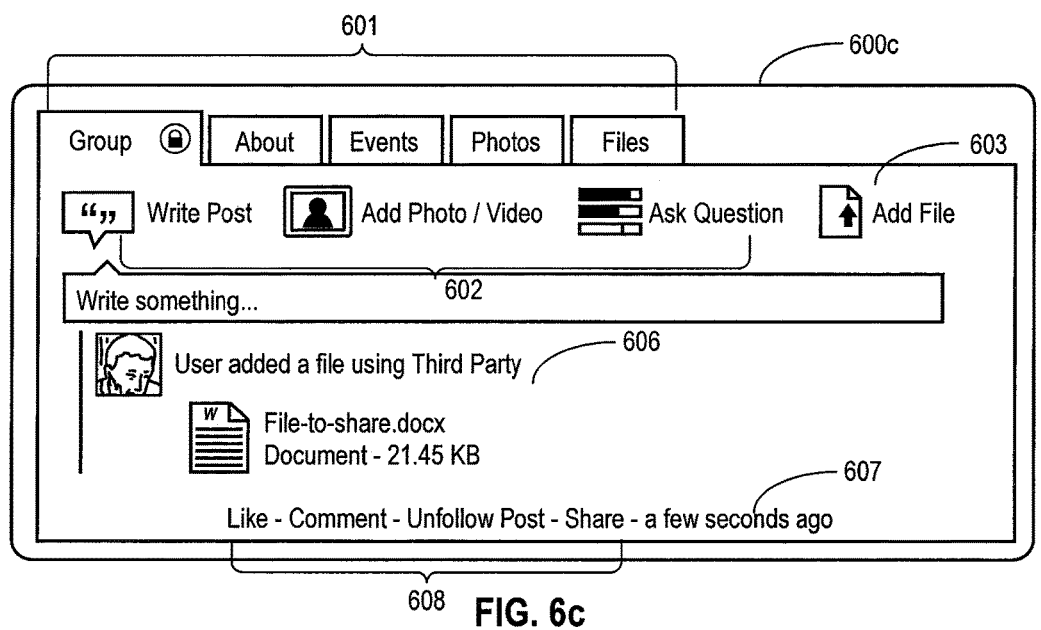

FIGS. 6a-6c illustrate exemplary GUI windows displaying group content, including an interface for enabling third party interaction, according to embodiments of the invention.

FIG. 6a illustrates an example of a GUI window 600a, which a user might see when requesting access to content for a group. For example, the GUI window 600a can be rendered from HTML content for a group sent by a social networking system (e.g., the social networking system 102 of FIG. 1) to a user device (e.g., the user device 106 of FIG. 1). The GUI window 600a includes links 601, represented here as tabs. The links 601 can include mechanisms for linking to different content, for example, URLs to different webpages for the group. Links 601, for example, can include URLs to link to a "main group page," an "about group page," an "events group page," a "photos group page," and a "files group page." In other embodiments, more or fewer group pages may be available. The "files group page" can include, for example, shared files and/or folders. The social networking system can present a different view of the "files group page" to a user depending on whether the user has access to the file or folder. For example, if the user has not gained access to a folder (e.g., if the user has not actively joined the folder, if the user has not granted permissions to the third party system, etc.), the social networking system can present a "read-only" view. In a "read-only" view, a user may be able to view some attributes of a file or folder such as the name of a file or folder, other users who have access to the folder, etc. The social networking system may also provide a mechanism for the user to gain access to the folder. If the user does have access to the folder, the social networking system can present an "interactive" view. An interactive view may provide additional mechanisms for accessing or otherwise interacting with a file or folder. For example, a social networking system can send the user additional information such as revision history, and/or contents of a shared folder, and allow the user to comment on revisions of a file or folder.

The icons 602 indicate different actions a user can take, for example "Write Post," "Add Photo/Video," "Ask Question," or "Add File." Other, more, or fewer user actions are also possible. For example, other options could include "Add invitation from Third Party Invitation System," "Add music station from Third Party Radio System," or any other user action with respect to groups.

If a user selects the "Add File" action 603, the GUI can include a file selection section 604. The file selection section 604 includes the button "Choose File," to enable a user to select a third party file to share with the group. If the user selects "Choose File," the group content can cause a dialog box 605 (e.g., a popup window) to appear including an inline frame. The inline frame can link to a third party system. For example, the inline frame in popup window 605 can be directed to a URL for the Third Party File Sharing System 404 of FIG. 4a. In the illustrated example, the dialog box 605 includes a selection of files located on a third party server. If the user selects the file "File-to-share.docx" and pushes the "Select" button, the third party system can send the information to the user and/or the social networking system. For example, the third party system can send metadata such as the filename "File-to-share.docx" and/or other identifying information such as a transaction ID. The third party system can also communicate with the social networking system (e.g., via an API call) to request that the social networking system close or resize the dialog box 605, or communicate other information (e.g., information related to a file selected by a user).

FIG. 6*b* illustrates another GUI window 600*b*. The GUI window 600*b* is displayed after the user has selected a file from the third party system to share. The file selection section 604 now indicates that the selected file is "File-to-share.docx." In order to share the file with the group, the user can select the "Post" button in the file selection section 604. In one embodiment, selecting the "post" results in exchange 309 of FIG. 3*a* where the user device 304 sends the information related to the service to share with the group and the transaction ID and/or metadata.

FIG. 6*c* illustrates another GUI window 600*c*. The GUI window 600*c* can be displayed after the user has selected the "Post" button to share the selected file with the group. The GUI window 600*c* includes a message 606 describing that the user has shared the file with the group. As illustrated, the message also includes metadata, as well as a link to the file stored on a third party server. The message 606 includes a timestamp 607 and links 608 which provide user actions related to the file. The illustrated user actions include "Like," "Comment," "Unfollow Post," and "Share." Other user actions could include "Delete," "View file revision history," "View file permissions," and other user actions related to the shared file. If a user removes the message 606 from the group page, the social networking system can break the association to the third party service. For example, if a user removes the message 606 indicating that the user added a file using the third party system, the link to the file may no longer be available on the group page, the third party system may no longer push notifications about updates to the social networking system, and/or the social networking system may no longer push notifications about updates to the group.

Figure 7:
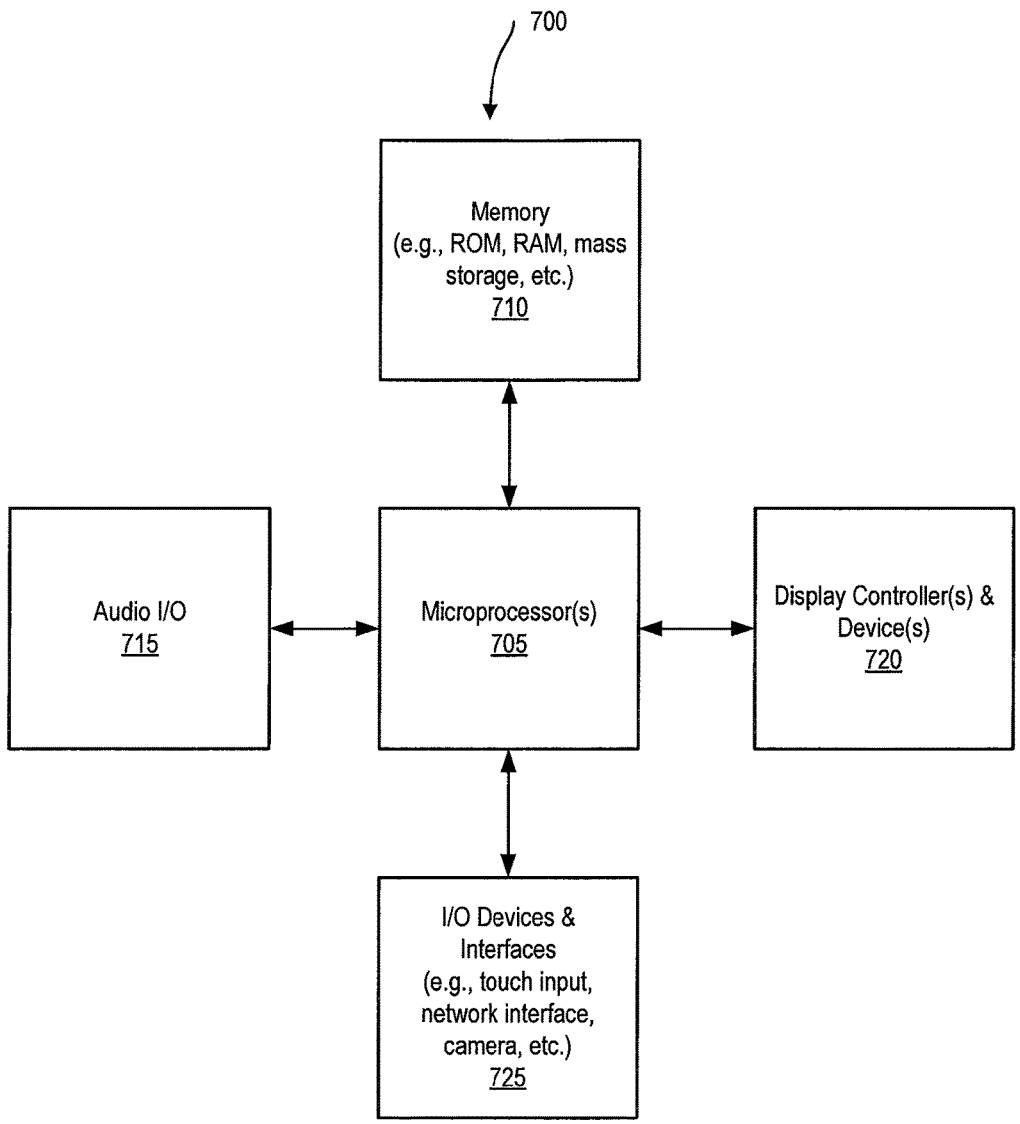
FIG. 7 illustrates a computing system in which embodiments may operate, be installed, integrated, or configured.

FIG. 7 illustrates, in block diagram form, an exemplary computing system 700 in accordance with which embodiments may operate, be installed, integrated, or configured. The computing system 700 includes one or more microprocessors 705 and connected system components (e.g., multiple connected chips). Alternatively, the computing system 700 is a system on a chip.

The computing system 700 includes memory 710, which is coupled to the microprocessor(s) 705. The memory 710 may be used for storing data, metadata, and programs for execution by the microprocessor(s) 705. The memory 710 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 710 may be internal or distributed memory.

The computing system 700 also includes an audio input/output subsystem 715 which may include a microphone and/or a speaker for, for example, playing back music or other audio, receiving voice instructions to be executed by the microprocessor(s) 705, playing audio notifications, etc.

A display controller and display device 720 provides a visual user interface for the user, e.g., GUI windows illustrated in FIGS. 6*a*-6*c*.

The computing system 700 also includes one or more input or output ("I/O") devices and interfaces 725, which are provided to allow a user to provide input to, receive output from, and otherwise transfer data to and from the system. These I/O devices 725 may include a mouse, keypad or a keyboard, a touch panel or a multi-touch input panel, camera, optical scanner, network interface, modem, other known I/O devices or a combination of such I/O devices. The touch input panel may be a single touch input panel which is activated with a stylus or a finger or a multi-touch input panel which is activated by one finger or a stylus or multiple fingers, and the panel is capable of distinguishing between one or two or three or more touches and is capable of providing inputs derived from those touches to the computing system 700.

The I/O devices and interfaces 725 may also include a connector for a dock or a connector for a USB interface, FireWire, Thunderbolt, Ethernet, etc. to connect the computing system 700 with another device, external component, or a network. Exemplary I/O devices and interfaces 725 also include wireless transceivers, such as an IEEE 802.11 transceiver, an infrared transceiver, a Bluetooth transceiver, a wireless cellular telephony transceiver (e.g., 2G, 3G, 4G), or another wireless protocol to connect the computing system 700 with another device, external component, or a network and receive stored instructions, data, tokens, etc.

It will be appreciated that one or more buses, may be used to interconnect the various components shown in FIG. 7.

In one embodiment, the computing system 700 is an exemplary representation of the user device 106 of FIG. 1. The computing system 700 may be a personal computer, tablet-style device, a personal digital assistant (PDA), a cellular telephone with PDA-like functionality, a Wi-Fi based telephone, a handheld computer which includes a cellular telephone, a media player, an entertainment system, or devices which combine aspects or functions of these devices, such as a media player combined with a PDA and a cellular telephone in one device. In other embodiments, the computing system 700 may be a network computer, server, or an embedded processing device within another device or consumer electronic product. As used herein, the terms computer, system, device, processing device, and "apparatus comprising a processing device" may be used interchangeably with the computing system 700 and include the above-listed exemplary embodiments.

It will be appreciated that additional components, not shown, may also be part of the computing system 700, and, in certain embodiments, fewer components than that shown in FIG. 7 may also be used in a computing system 700. It will be apparent from this description that aspects of the inventions may be embodied, at least in part, in software. That is, computer-implemented methods may be carried out in a computer system or other data processing system in response to its processor or processing system executing sequences of instructions contained in a memory, such as memory 710 or other non-transitory machine-readable storage medium. The software may further be transmitted or received over a network (not shown) via a network interface device 725. In various embodiments, hardwired circuitry may be used in combination with the software instructions to implement the present embodiments. Thus, the techniques are not limited to any specific combination of hardware circuitry and software, or to any particular source for the instructions executed by the computing system 700.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described herein may be performed with fewer or more features/blocks or the features/blocks may be performed in differing orders. Additionally, the methods described herein may be repeated or performed in parallel with one another or in parallel with different instances of the same or similar methods.

What is claimed is:

1. A method comprising:
   receiving, by a communication system, a request from a user device to access content for a group of users of the communication system, the group of users being a subset of users of the communication system;
   sending, by the communication system, the content for the group of users of the communication system to the user device, the content including a graphical user interface usable to access a third party system, the graphical user interface enabling a user of the user device to select user data stored by a third party service on a third party server and retrieve information related to the third party service from the third party system, the information related to the third party service usable by the group of users to access the selected user data on the third party server;
   receiving, by the communication system, the information related to the third party service from the user device to share with the group, the information related to the third party service retrieved by the user via the graphical user interface; and
   sending, by the communication system, the information related to the third party service to one user of the group of users based on the one user of the group of users requesting access to the content.

2. The method of claim 1, wherein the information related to the third party service is a link to access the user data stored on the third party server.

3. The method of claim 1, wherein the user data comprises a folder stored on the third party server.

4. The method of claim 3, further comprising:
   receiving updates from the third party system when a file in the folder is added, updated, or deleted; and
   sending updated information related to the folder to the one of the group of users based on receiving the updates and the one of the group of users requesting access to the content.

5. The method of claim 1, wherein access to the user data is based on membership in the group.

6. The method of claim 1, further comprising:
   sending notice to the third party system that the information related to the third party service is shared with the group;
   receiving an update related to the third party service from the third party system; and
   sending updated information related to the third party service to the one of the group of users based on receiving the update and the one of the group of users requesting access to the content.

7. The method of claim 1, wherein sending the information related to the third party service comprises sending a Uniform Resource Locator (URL) to access the third party service from a third party server.

8. The method of claim 1, further comprising:
   storing the information related to the third party service in a graph, the graph comprising a plurality of nodes and a plurality of edges representing relationships between two nodes, wherein the plurality of nodes includes a first node for the group and a second node associated with the third party service and wherein the plurality of edges includes an edge between the first node and the second node indicating the information related to the third party service is shared with the group.

9. The method of claim 8, wherein the plurality of nodes further includes a third node for the user, and the plurality of edges further includes an edge between the first node and the third node indicating the user shared the information related to the third party service with the group.

10. The method of claim 8, further comprising:
    receiving, at an API request server of the communication system, a request from the third party system to add to the graph: the first node and the edge between the first node and the second node;
    sending, from the API request server to the third party system, an action ID identifying the added edge; and
    receiving, at a web server of the communication system, the action ID from the third party system, wherein sending the information related to the third party service is further based on the action ID.

11. The method of claim 1, further comprising:
    determining that the user has not granted permission to the third party system to send the information related to the third party service to the communication system; and
    in response to determining the user did not grant the permission, sending a request to the user to grant the permission.

12. The method of claim 1, wherein sending the content including the interface comprises:
    sending an inline frame (iframe) targeting a Uniform Resource Locator (URL) of the third party system.

13. The method of claim 1, wherein sending the information related to the third party service comprises sending content for rendering a message describing an interaction of the user with the third party service.

14. The method of claim 1, further comprising:
granting permission to the third party system to manage membership in the group; and
receiving notification from the third party system to grant membership in the group to a second user of the communication system based on an email address of the second user stored on a third party server for the third party service.

15. The method of claim 1, further comprising:
sending notification to the third party system of a change in group membership, wherein the third party system is to poll the communication system to determine group membership based on receiving the notification.

16. A non-transitory computer-readable storage medium storing instructions, which when executed by a processing device, cause the processing device to perform method comprising:
receiving, by a communication system, a request from a user device to access content for a group of users of the communication system, the group of users being a subset of users of the communication system;
sending, by the communication system, the content for the group of users of the communication system to the user device, the content including a graphical user interface usable to access a third party system, the graphical user interface enabling a user of the user device to select user data stored by a third party service on a third party server and retrieve information related to the third party service from the third party system, the information related to the third party service usable by the group of users to access the selected user data on the third party server;
receiving, by the communication system, the information related to the third party service from the user to share with the group, the information related to the third party service retrieved by the user via the graphical user interface; and
sending, by the communication system, the information related to the third party service to one user of the group of users based on the one user of the group of users requesting access to the content.

17. The non-transitory computer-readable storage medium of claim 16, wherein:
the information related to the third party service comprises a link to access the user data stored on the third party server.

18. The non-transitory computer-readable storage medium of claim 16, the method further comprising:
sending notice to the third party system that the information related to the third party service is shared with the group;
receiving an update related to the third party service from the third party system; and
sending updated information related to the third party service to the one of the group of users based on receiving the update and the one of the group of users requesting access to the content.

19. An apparatus comprising:
a processing device, wherein the processing device executes instructions that cause the apparatus to:
send a request to a communication system to access content for a group of users of the communication system, the group of users being a subset of users of the communication system;
receive, from the communication system, the content for the group of users of the communication system, the content including a graphical user interface usable to access a third party system, the graphical user interface enabling a user of the apparatus to select user data stored by a third party service on a third party server;
retrieve, via the interface, information related to the third party service from the third party system, the information related to the third party service usable by the group of users to access the selected user data on the third party server;
send the information related to the third party service to the communication system to share with the group; and
receive, from the communication system, the information related to the third party service based on requesting access to the content.

20. The apparatus of claim 19, wherein the information related to the third party service comprises a link to access the user data stored on the third party server.

* * * * *